United States Patent [19]
Storhok

[11] Patent Number: 5,623,906
[45] Date of Patent: Apr. 29, 1997

[54] FIXED THROTTLE TORQUE DEMAND STRATEGY

[75] Inventor: Eric M. Storhok, Ann Arbor, Mich.

[73] Assignee: Ford Motor Company, Dearborn, Mich.

[21] Appl. No.: 589,239

[22] Filed: Jan. 22, 1996

[51] Int. Cl.[6] ............................................. F02D 43/04
[52] U.S. Cl. .......................... 123/419; 123/399; 123/481
[58] Field of Search ..................................... 123/361, 399, 123/419, 436, 479, 481, 416, 417

[56] References Cited

U.S. PATENT DOCUMENTS

| | | | |
|---|---|---|---|
| 3,587,764 | 6/1971 | Bowles | 280/96.1 |
| 3,662,624 | 5/1972 | Leonard | 477/111 |
| 4,026,251 | 5/1977 | Schweitzer et al. | 123/436 |
| 4,398,514 | 8/1983 | Nakamura | 123/339.12 |
| 4,509,477 | 4/1985 | Takao et al. | 123/339.11 |
| 4,513,721 | 4/1985 | Ina et al. | 123/478 |
| 4,658,787 | 4/1987 | Takizawa | 123/418 |
| 4,732,125 | 3/1988 | Takizawa | 123/422 |
| 4,779,597 | 10/1988 | Takaku et al. | 123/479 |
| 4,803,967 | 2/1989 | Ohkumo | 123/422 |
| 4,856,610 | 8/1989 | Leiber et al. | 180/197 |
| 4,915,076 | 4/1990 | Takizawa | 123/418 |
| 5,010,866 | 4/1991 | Ohata | 123/436 |
| 5,092,298 | 3/1992 | Susuki et al. | 123/361 |
| 5,097,809 | 3/1992 | Sekozawa et al. | 123/422 |
| 5,156,128 | 10/1992 | Nakagawa | 123/436 |
| 5,168,853 | 12/1992 | Kittelson et al. | 123/419 |
| 5,197,431 | 3/1993 | Takaba et al. | 123/423 |
| 5,253,623 | 10/1993 | Melnyk et al. | 123/339.11 |
| 5,325,832 | 7/1994 | Maute et al. | 123/396 |
| 5,370,094 | 12/1994 | Sorg et al. | 123/399 |
| 5,429,090 | 7/1995 | Kotchi et al. | 123/396 |
| 5,445,124 | 8/1995 | Tomisawa et al. | 123/339.11 |

*Primary Examiner*—Tony M. Argenbright
*Attorney, Agent, or Firm*—Peter Abolins

[57] ABSTRACT

This invention teaches operating a vehicle with a fixed throttle by determining a modified torque which is determined as a function of driver demand torque. Such modified torque is used to determine the amount spark retard or fuel cut-out required to achieve the demanded torque.

4 Claims, 1 Drawing Sheet

FIXED THROTTLE TORQUE DEMAND STRATEGY

BACKGROUND OF THE INVENTION

1. Field of the Invention

The invention relates to electronic engine control of internal combustion engines.

2. Prior Art

U.S. Pat. No. 4,779,597 teaches a means for controlling fuel flow or secondary air in the event of a stuck throttle when operating an internal combustion engine. Similarly, U.S. Pat. No. 5,325,832 issued to Maute et al. also teaches an emergency driving function in the event of a stuck or disabled throttle. However, there is no teaching of specifically calculating available engine torque as part of an engine control strategy.

While these and other patents teach maintaining some vehicle driveability in the event of a stuck throttle, there is still a need for improved failure mode operation of an internal combustion engine. These are some of the problems this invention overcomes.

SUMMARY OF THE INVENTION

This invention teaches-using a maximum estimated throttle from a fixed throttle engine and pedal position to determine the amount of torque reduction required from a fuel cut out and spark retard torque control strategy.

A strategy in accordance with an embodiment of this invention allows an operator to drive with a fixed throttled engine. The strategy estimates the maximum torque the engine can produce with throttle position, engine speed, EGR (Exhaust Gas Recirculation), air charge temperature, and estimated barometric pressure data. Such maximum torque is modified as a function of desired torque as indicated by accelerator pedal position sensor data which is passed to a fuel spark torque control strategy.

This presents an improved method for engine torque control for a fixed throttle engine and improves failure mode management in an internal combustion engine.

DETAILED DESCRIPTION OF THE INVENTION

Figure 1:
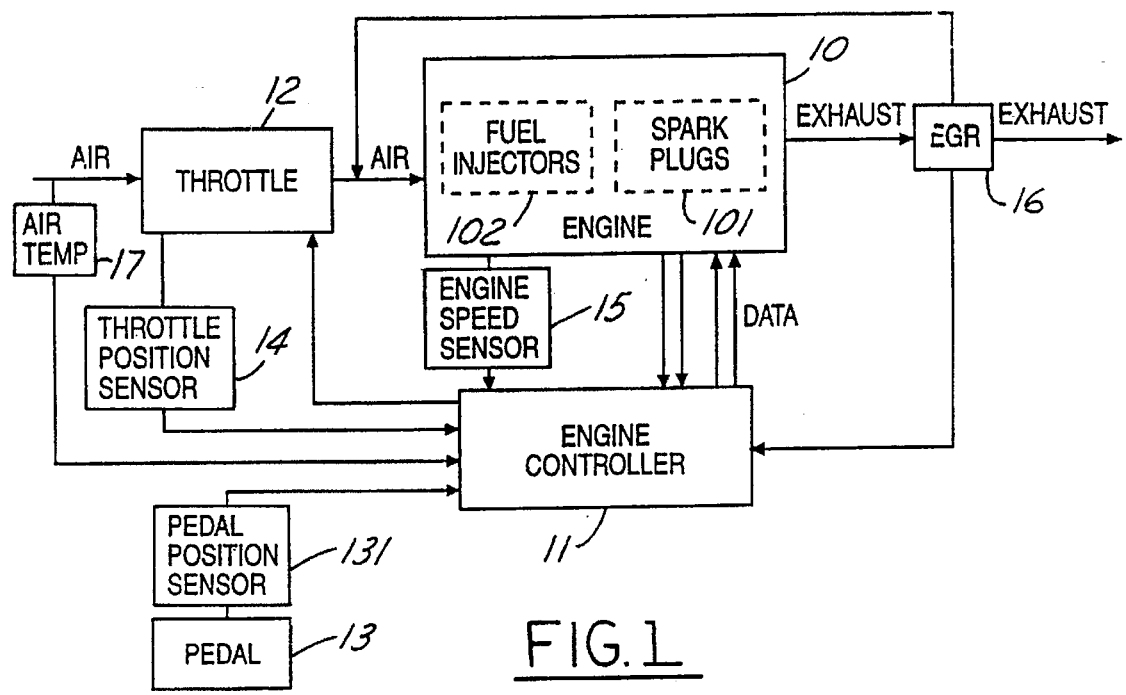
FIG. 1 is a block diagram of an internal combustion engine and associated electronic engine control system in accordance with an embodiment of this invention.

Referring to FIG. 1, an engine 10 is coupled to an electronic engine control module 11. Engine 10 has an air input throttle 12 which is operationally coupled to engine control module 11. Throttle 12 is coupled to a pedal 13 operated by the driver. A sensor 14 is coupled to throttle 12 to sense throttle position and provide an input signal to engine control module 11. A sensor 131 is coupled to pedal 13 to sense pedal position and provide an input signal to engine control module 11. An engine speed sensor 15 is coupled to engine 10 and provides a signal to electronic engine control module 11. An exhaust gas recirculation valve 16 provides a signal to electronic engine control module 11. An air charge temperature sensor 17 is coupled to an air flow path into engine 10 and provides a signal to electronic engine control module 11. Electronic engine control module 11 includes a stored fuel and spark strategy for controlling the operation of engine 10.

Figure 2:
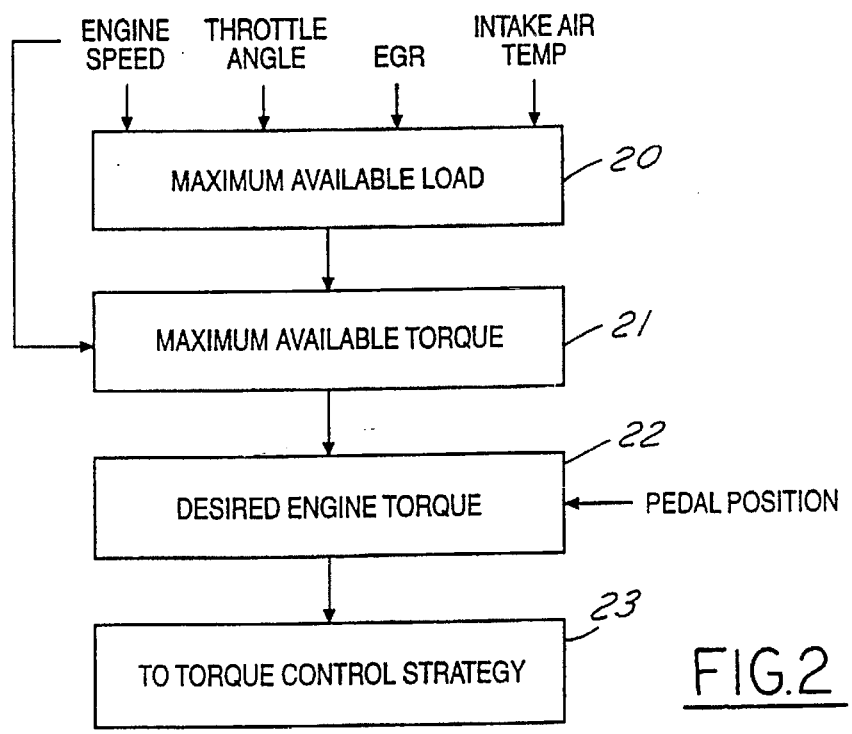
FIG. 2 is a logic flow diagram in accordance with an embodiment of this invention.

Referring to FIG. 2, a logic flow block 20 starts logic flow in accordance with an embodiment of this invention. Block 20 has inputs from sensors indicating engine speed, throttle angle, EGR, and intake air temperature. Block 20 includes a calculation of maximum available load for the engine. Load is a dimensionless factor indicating the ratio of actual mass air flow into the engine with respect to the maximum mass air flow into the engine. Logic flow goes to a block 21 where the maximum available torque is calculated. Block 21 also has an input indicating engine speed. Logic flow from block 21 goes to a block 22 wherein the desired engine torque is calculated. Block 22 also as an input indicating pedal position. More particularly, net available torque is determined by subtracting torque losses to account for friction, air conditioning load, power steering pump losses, etc. The net available torque following these calculations is then multiplied by a pedal position variable, which is an predication of the torque demand of the vehicle operator. The torque desired by the operator is a result of the multiplication of the pedal position factor with the net available torque. Logic flow from block 22 goes to a block 23 which generates an output for the torque control strategy of an engine control system. That is, the desired torque is then transferred to a torque control strategy, which is used to determine the spark advance or fuel cutout, or a combination of both, in order to achieve the desired or demanded torque. A result of the calculations determined by the torque control strategy is a comparison of the actual torque with the desired torque.

For a driver to operate a vehicle with a fixed throttle 12, engine torque must be reduced by means other than regulating air flow. Engine control module 11 has stored engine control strategy. Thus a strategy is already in place to reduce torque by retarding spark and cutting out fuel injectors. Engine 10 includes spark plugs 101 and fuel injectors 102 which are coupled for operation to electronic engine module 11. The stored strategy for controlling torque by retarding spark and cutting out fuel injectors is used in connection with engine operating conditions such as traction assist and speed limiting.

In summary, a strategy in accordance with an embodiment of this invention determines the driver demand torque as a percentage of the maximum torque available from the fixed throttle engine and passes this torque to the existing torque control strategy in electronic engine control module 10. To first determine the maximum available throttle, the engine control strategy estimates the maximum available load using the estimated sea level load functions, engine speed, exhaust gas recirculation (EGR) flow, air charge temperature and barometric pressure. The load is then converted to indicated torque with an engine speed load function, and torque losses are subtracted. This torque is then multiplied by a pedal demand function, which uses pedal position to calculate what percentage of the maximum torque the driver desires.

This modified torque is then passed to the torque control strategy which determines how much spark retard or fuel cut-out is required to achieve this demanded torque.

More particularly, in accordance with an embodiment of this invention, this system will determine the maximum available torque based on the electronic throttle position, and base the engine output torque on a percentage of this value. The system is defined as follows:

INPUTS

| | |
|---|---|
| ACT | air charge temperature |
| BP | barometric pressure (bp) |
| N | engine speed |
| ETP_rel | relative throttle position of electronic throttle |
| EGRACT | actual egr rate |
| IAC | intake runner control state |
| TQ_LOSS | torque (tq) losses for inferred tq |
| % FA | percent foot angle |

CALIBRATION PARAMETERS

| | |
|---|---|
| FN059 | temperature compensation for inferred bp |
| FN1036A | load at sea level for n vs tp_rel (engine speed versus relative throttle position) |
| FN1036B | load at sea level for n vs tp_rel, secondarys open |
| FN1037 | load from egr, n vs tp_rel |
| FN1615A | indicated engine torque, n vs load |
| FN0ETC_FMEM | driver demand transfer function, expressed as percentage, where desired torque is determined as a percentage of maximum torque |

OUTPUTS

| | |
|---|---|
| max_av_load | maximum load available for a fixed ETC (Electronic Throttle Control) position |
| max_av_tq | maximum tq available for a fixed ETC position |
| da_tq_fmem | driver requested engine torque for fixed throttle situation |
| If the state of IAC equals "1", then | |
| max_av_load = | [fn1036b(n,etp_rel) − egract/10 * fn1037(n,etp_rel)] * fn059(act)*bp/29.92 |
| If the state of IAC does not equal "1", then | |
| max_av_load = | [fn1036a(n,etp_rel) − egract/10 * fn1037(n,etp_rel)] * fn059(act)*bp/29.92 |
| Calculating maximum available torque: | |
| max_av_tq = | fn1615a(n,max_av_laod) |
| Calculating desired torque: | |
| da_tq_fmem = | [max_av_tq − tq_loss]*fn0etc_fmem(% fa) | wherein calculating desired torque includes determining a net torque by subtracting an engine torque loss from maximum available torque at the fixed throttle condition. Such net torque is then multiplied by a calibration function indicating a desired torque percentage. More specifically, the percentage of desired torque with respect to maximum torque is determined as a function of the percentage of foot angle indicating accelerator position.

The process continues by sending da_tq_fmem to the torque control module, where the number of cylinders to be turned off is determined and spark advance reduction is calculated and implemented.

Various modifications and variations will no doubt occur to those skilled in the art to which this invention pertains. Such variations which basically rely on the teachings through which this disclosure has advanced the art are properly considered within the scope of this invention.

We claim:

1. A method for operating an internal combustion engine having a fixed throttle including the steps of:
   determining a desired driver engine torque;
   determining a maximum available engine torque;
   controlling engine torque as a function of the ratio of a desired engine torque to a maximum available engine torque;
   sensing engine speed, throttle angle, exhaust gas recirculation, intake air temperature, and accelerator pedal position;
   developing signals representing engine speed, throttle angle, exhaust gas recirculation, intake air temperature, and accelerator pedal position;
   calculating the maximum available engine load;
   calculating the maximum available engine torque using engine load and engine speed;
   determining desired driver demand engine torque as a percentage of the maximum torque available; and
   reducing actual engine torque to desired engine torque by retarding spark advance and cutting out fuel injector operation.

2. A method as recited in claim 1 further including the step of determining the maximum available engine torque by:
   estimating the maximum available torque using a stored sea level load function, actual engine speed, actual EGR flow, actual air charge temperature, and inferred barometric pressure.

3. A method as recited in claim 2 further comprising the steps of:
   calculating desired torque by determining a net torque by subtracting an engine torque loss from maximum available torque at the fixed throttle condition, such net torque being then multiplied by a calibration function indicating a desired torque percentage, so that the percentage of desired torque with respect to maximum torque is determined as a function of the percentage of foot angle indicating accelerator position; and
   sending a driver requested engine torque to a torque control module, where a number of cylinders to be turned off is determined and spark advance reduction is calculated and implemented.

4. A method for operating an internal combustion engine including the steps of:
   determining the throttle is in a fixed position;
   sensing the following inputs:

| | |
|---|---|
| ACT | air charge temperature |
| BP | barometric pressure |
| N | engine speed |
| ETP_rel | tp_rel of electronic throttle |
| EGRACT | actual egr rate |
| IAC | intake runner control state |
| TQ_LOSS | tp losses for inferred tq |
| % FA | percent foot angle; | determining the following calibration parameters:

| | |
|---|---|
| FN059 | temperature compensation for inferred bp |
| FN1036A | load at sea level for n vs tp_rel |
| FN1036B | load at sea level for n vs tp_rel, secondarys open |
| FN1037 | load from egr, n vs tp_rel |
| FN1615A | indicated engine torque, n vs load |
| FN0ETC_FMEM | driver dem and transfer function, percentage of torque available; and | generating the following outputs in accordance with the following equations:

| | |
|---|---|
| max_av_load | maximum load available for a fixed ECT position |
| max_av_tq | maximum tq available for a fixed ETC position |
| da_tq_fmem | driver requested engine torque for FMEM situation | if the state of IAC equals "1", then determining:

| | |
|---|---|
| max_av_load = | [fn1036b(n,etp_rel) − egract/10 * fn1037(n,etp_rel)] * fn059(act)*bp/29.92 | if the state of IAC does not equal "1", then determining:

| | |
|---|---|
| max_av_load = | [fn1036a(n,etp_rel) − egract/10 * fn1037(n,etp_rel)] * fn059(act)*bp/29.92 | calculating maximum available torque using:

max_av_tq=fn1615a(n,max_av_laod)

calculating desired torque using:

| | |
|---|---|
| da_tq_fmem = | [max_av_tq − tq_loss]*fn0etc_fmem(% fa) | thereby calculating desired torque by determining a net torque by subtracting an engine torque loss from maximum available torque at the fixed throttle condition, such net torque being then multiplied by a calibration function indicating a desired torque percentage, so that the percentage of desired torque with respect to maximum torque is determined as a function of the percentage of a foot angle indicating accelerator position; and sending da_tq_fmem to a torque control module, where a number of cylinders to be turned off is determined and spark advance reduction is calculated and implemented.

* * * * *